(12) United States Patent
Florez et al.

(10) Patent No.: US 9,792,458 B2
(45) Date of Patent: Oct. 17, 2017

(54) PLATFORM TO BUILD SECURE MOBILE COLLABORATIVE APPLICATIONS USING DYNAMIC PRESENTATION AND DATA CONFIGURATIONS

(71) Applicant: IMS Health Incorporated, Danbury, CT (US)

(72) Inventors: Elkin Florez, Richmond Hills (CA); Ryan Fung, North York (CA); Charles Blair, Toronto (CA); David Annan, Oakville (CA); Hussam Mahgoub, Toronto (CA)

(73) Assignee: IMS HEALTH INCORPORATED, Danbury, CT (US)

( * ) Notice: Subject to any disclaimer, the term of this patent is extended or adjusted under 35 U.S.C. 154(b) by 457 days.

(21) Appl. No.: 14/269,893

(22) Filed: May 5, 2014

(65) Prior Publication Data
US 2015/0317493 A1    Nov. 5, 2015

(51) Int. Cl.
*G06F 21/00* (2013.01)
*G06F 21/62* (2013.01)
(Continued)

(52) U.S. Cl.
CPC ........ *G06F 21/6263* (2013.01); *G06F 21/602* (2013.01); *G06F 21/604* (2013.01);
(Continued)

(58) Field of Classification Search
CPC ............. G06F 21/6263; G06F 21/6218; G06F 21/604; G06F 21/602; H04W 12/02; H04W 12/06
See application file for complete search history.

(56) References Cited

U.S. PATENT DOCUMENTS

| 7,680,755 B2 | 3/2010 | Machani |
| 8,130,961 B2 | 3/2012 | Machani et al. |

(Continued)

FOREIGN PATENT DOCUMENTS

| WO | 2014062395 A1 | 4/2014 | |
| WO | WO 2014062395 A1 * | 4/2014 | ............ H04L 67/34 |

OTHER PUBLICATIONS

Extended European Search Report issued in European Application No. 15166007.3 dated Oct. 8, 2015; 6 Pages.

(Continued)

*Primary Examiner* — Kendall Dolly
(74) *Attorney, Agent, or Firm* — Maldjian Law Group LLC

(57) ABSTRACT

System and method to provide access to protected data for a communication terminal, the system including: a publisher database configured to store protected data in encrypted form; a first server coupled to the publisher database; a second server coupled to the first server, the second server configured to provide a cryptographically strong authentication of access to the protected data; an interface to a first secure channel, between the first server and the communication terminal; and an interface to a second secure channel, between the first server and a customer application, wherein the first server is configured to exchange protected data with the communication terminal via the first secure channel, and to exchange protected data with the customer application via the second secure channel.

20 Claims, 8 Drawing Sheets

(51) Int. Cl.
G06F 21/60 (2013.01)
H04W 12/06 (2009.01)
H04W 12/02 (2009.01)

(52) U.S. Cl.
CPC ........ *G06F 21/6218* (2013.01); *H04W 12/02* (2013.01); *H04W 12/06* (2013.01)

(56) References Cited

U.S. PATENT DOCUMENTS

| | | |
|---|---|---|
| 8,560,849 B2 | 10/2013 | Machani et al. |
| 2008/0148040 A1 | 6/2008 | Machani et al. |
| 2009/0320088 A1* | 12/2009 | Gill ........................ G06F 21/604 |
| | | 726/1 |
| 2011/0208965 A1 | 8/2011 | Machani |
| 2014/0194094 A1* | 7/2014 | Ahuja .................... H04W 4/021 |
| | | 455/410 |

OTHER PUBLICATIONS

Chelsea Baldwin, Cross Platform Mobile Development Tools: Ending the iOS vs. Android Debate, Retrieved May 9, 2016 from http://thinkapps.com/blog/development/develop-for-ios-v-android-cross-platform-tools/, 17 pages.

European Communication dated Jan. 24, 2017, European patent application No. 15166007.3, IMS Health Incorporated, 4 pages.

\* cited by examiner

100

200

250

400

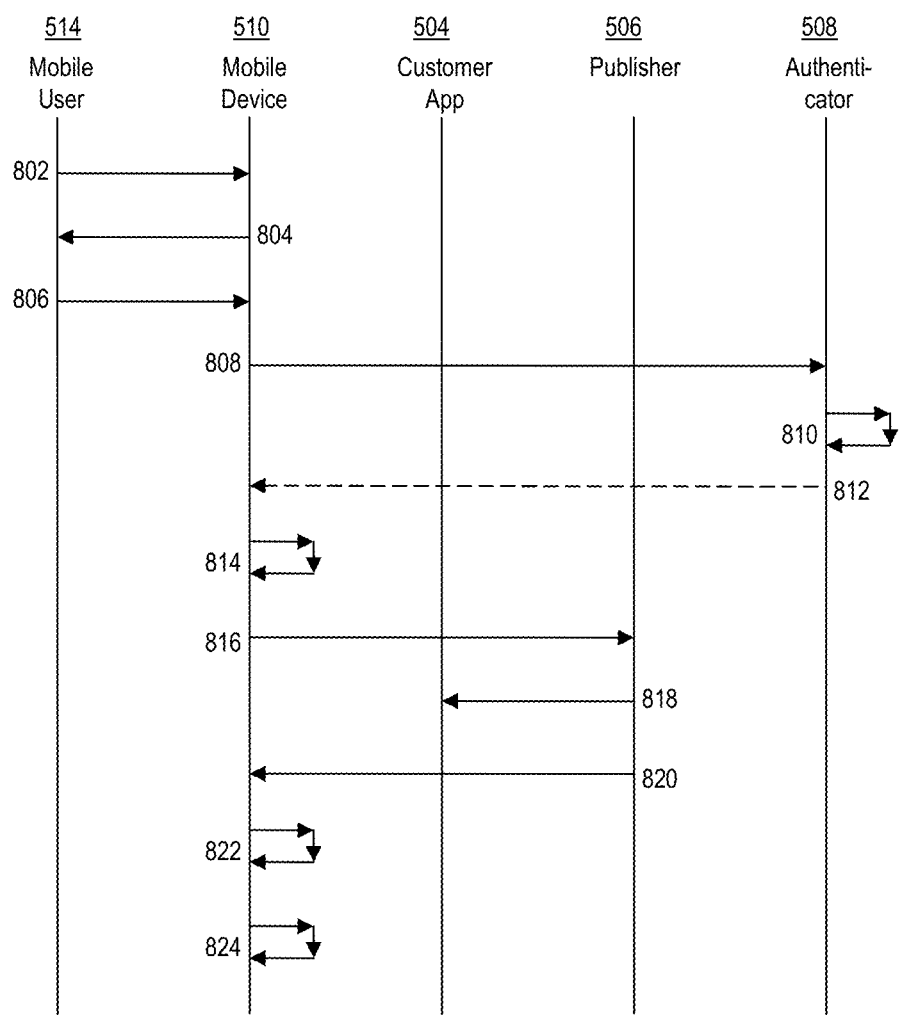

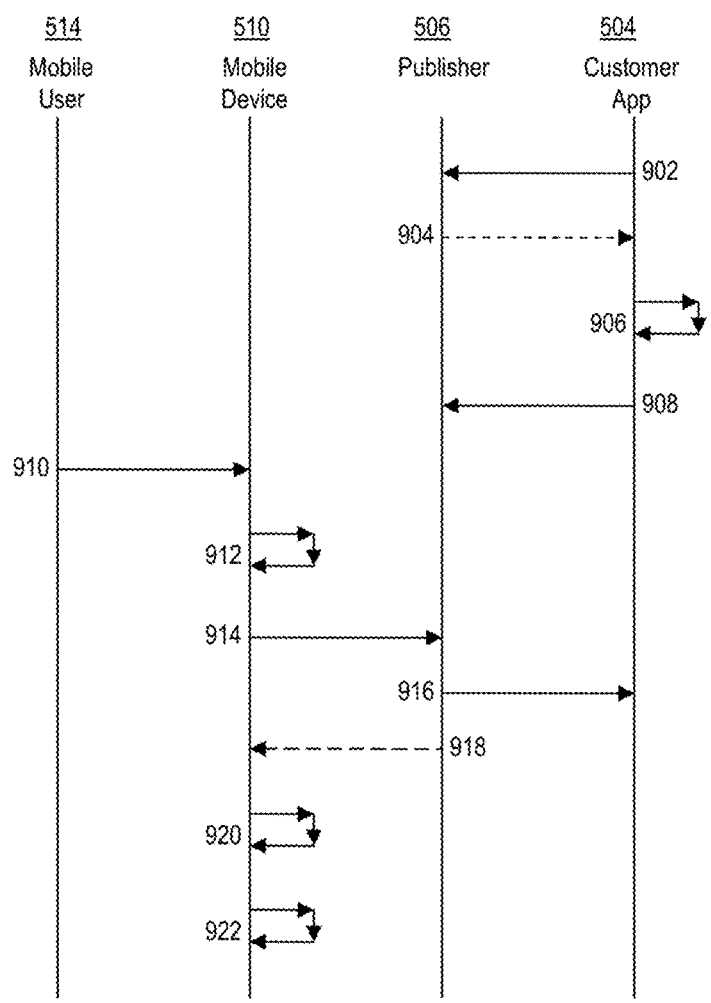

PLATFORM TO BUILD SECURE MOBILE COLLABORATIVE APPLICATIONS USING DYNAMIC PRESENTATION AND DATA CONFIGURATIONS

BACKGROUND

Field of the Invention

Embodiments of the present invention generally relate to a secure application development platform, and, in particular, to a system and method for developing secure mobile applications to access sensitive data such as health information.

Description of Related Art

Mobile health ("mHealth") is a term for medical and public health practice supported by communication terminals such as mobile phones, patient monitoring devices, personal digital assistants (PDAs), and other mobile or wireless devices. mHealth involves the use of voice and short messaging service (SMS) as well as more complex technologies such as mobile data communication systems (e.g., 3G, 4G, 4GLTE, etc.), global positioning systems (GPS), and Bluetooth technology.

The advanced computing capability of smartphones that are typically optimized for internet usage allows individuals to access sensitive data, personal information and advice (including but not limited to that related to health and medical care) from anywhere at any time. The smartphones also provide functionality that is not available via a laptop such as an ability to capture information from sensors on the move and the addition of GPS and camera functions. The sensitive data, personal information and advice may be collectively referred to herein as sensitive personal information, unless a different meaning is clearly indicated either explicitly or by the context of usage.

A mobile application (or mobile app) is a software application designed to run on smartphones, tablet computers and other mobile devices. Some mobile apps are used to deliver sensitive personal information such as health care information to consumers, or to gather and send health status information from a consumer to a health care provider. Not all mobile apps relating to the exchange of sensitive personal information, for example those that have been developed in healthcare are widely available to consumers. Some of the most advanced medical apps are not necessarily designed to target general consumers. Some mobile apps have been designed for healthcare practitioners, others are for patients but require a prescription, and others are intended for only a small subset of patients. Some mobile apps require approval by the U.S. Food and Drug Administration (FDA). A mobile app may also be able to execute on other platforms such as a personal computer (PC) if it has been ported to the underlying operating system, e.g., from Android to Windows or iOS. As used herein, the term "mobile app" or "mobile application" may include an application that executes on a PC (e.g., desktop, tower, laptop, netbook, etc.) or other general-purpose consumer-computing device, without limitation to a mobile device unless mobility provides a stated benefit or unless otherwise clearly restricted by the context of usage.

Certain sensitive personal information like patient health information is protected by law (e.g., Healthcare Information Portability and Accountability Act ("HIPAA," codified at 42 U.S.C. §300 gg and 29 U.S.C §1181 et seq. and 42 USC 1320d et seq.) in the U.S.) and must be treated in a way that maintains patient privacy. Such information is termed protected health information (PHI). With respect to PHI, it is important that there is both transparency and awareness of how data entered into a mobile app is used, and that patient consent is obtained for use of PHI data. If a healthcare mobile app collects, stores, and/or transmits PHI, it is essential that the mobile app does so in full compliance with HIPAA and any other applicable laws or regulations of the country concerned. Any mobile app that is intended to connect to an Electronic Health Record (EHR) or Personal Health Record (PHR), which enables users to send and retrieve patient information between a mobile device and the EHR/PHR, must do so in a secure manner and all stakeholders involved must accept their stewardship role for protecting the PHI data contained within.

Data security encompasses several aspects of security, such as confidentiality (e.g., by use of encryption), integrity, availability, authenticity, non-repudiation, and access control, each one at different levels of the information life cycle. Data security is provided by use of encryption. Encryption is a standard tool for ensuring the privacy of data and communications. A variety of encryption schemes are commercially available to secure protected information, for example the Advanced Encryption Standard (AES), promulgated by the National Institute of Standards and Technology (NIST) as Federal Information Processing Standards Publication 197, Nov. 26, 2001. AES is a symmetric encryption scheme, such that a same cipher key is used for both encoding and decoding. The AES scheme itself exists in multiple variations, such as AES counter mode, AES cipher block chaining (CBC)+cipher text stealing (CTS), RSA, and so forth. Some variations of AES may be described in Request for Comment (RFC) 3962, "Advanced Encryption Standard (AES) Encryption for Kerberos 5," February 2005, and references cited therein.

Mobile applications are increasingly more important to companies in the conduct of business with customers and suppliers. In the case of organizations that deal with sensitive personal information such as health information, mobilization is highly desirable in order to reach patients directly, however, a mobile application that complies with all the security and architectural requirement required by HIPAA, is very difficult to build.

Mobile applications also contain interfaces to allow applications to undertake tasks that are not directly supported by the underlying operating system, such as secure messaging and surveys, and to undertake tasks that involve communication to devices that reside outside of the mobile device but have communication connectivity with the mobile device, such as Bluetooth devices, GPS, and so forth. Mobile devices evolve over time, and new features are added to them, so new interfaces will be added to mobile devices in order to support the new features. Although supporting new features may require updates to the operating system or application development tools, such updates do not happen very often compared to the frequency of configuration changes to application programs on the mobile device.

A major difficulty with supporting mobile devices is the policy and procedures with respect to updating the version of application programs deployed on mobile devices. When an updated application program is available, all users that have the application program must update the version of the application programs within their mobile. Some application programs provide a short versioning time (i.e., a length of time during which a particular version is a current version), other application programs may require longer versioning time, depending on a long list of factors such us stability, dynamic market, technical OS requirements, and so forth. Updating the application program version normally requires that a mobile device user communicate with a server such as an online app store and retrieve the new copy of the application program. This process may be slow and difficult because app stores tend to restrict application programs and delay the process of publishing new versions of the application programs.

Furthermore, most systems for mobile application development suffer deficiencies in their level of integration. Current implementations of applications for mobile devices predefine or hardcode the graphical user interface (GUI), data structure and logic, which are then packed together when the application is downloaded from the store or hosting server. Other types of mobile applications work completely online in a client/server mode to get or use the GUI, data structure and logic while the mobile device is connected to a server, and cannot operate effectively if there is no data connection to the server. Other applications have their GUI, data structure and logic hardcoded but allow connectivity to a server in order to synchronize data. A mobile device used as a client can execute only a predefined set of functions and have a predefined GUI.

Some known systems for mobile application development allow the creation of functions dynamically (e.g., for GUI, logic and data), and deliver those functions wirelessly, but lack integrated security in the communication, storage and process. Nor do such systems take into consideration that the server is an important part of the system in order to provide data recovery, security administration and the adoption of other types of access to information from the mobile device.

Therefore, what is needed is an integrated development platform to develop cryptographically secure mobile applications for mobile device users, the applications including but not limited to: mHealth uses; applications that implement government security standards such as HIPAA and NIST/FIPS; applications that communicate with server applications to dynamically update GUI, logic and data; applications that work online and offline; applications that can reconstruct their state and data in case the mobile device is lost or changed; and so forth.

SUMMARY

Embodiments in accordance with the present disclosure provide a Mobile Application Development Platform that integrates multiple features not previously available in a single platform. The integration provides synergies by providing to developers a simple interface to build their applications, thereby abstracting the complexity associated with security, application distribution and management. The integrated features may include built-in security, server synchronization and use of common development tools without a software developer needing to have detailed and/or low-level knowledge of the programming of various mobile operating systems, Embodiments simplify the development of compliant applications by offering application containers that enable HIPAA compliance. Organizations using the platform may focus only in one set of HTML/CSS JavaScript application that will operate on any supported mobile platform, reducing development effort and certification load.

In one embodiment, a system may include: a publisher database configured to store protected data in encrypted form; a publishing server coupled to the publisher database; a communication interface to a customer application; an authentication server coupled to the publishing server, the authentication server configured to authenticate an activation code provided through the publishing server, to validate mobile authentication One Time Passwords and to generate secure session keys for decrypting data from devices; and, wherein the customer application is configured to accept and post information from and to the mobile device. A mobile device comprising: a mobile application container (or container); and a secure storage coupled to the mobile container, wherein the mobile container is configured to execute a first mobile configuration application (or configuration) and an internal secure web server;

The application container is a mobile application that can host and support the usage of several application configurations. Each configuration describes the GUI appearance, application flow, logic and data. The container may start with one configuration that is identified as the first configuration. The first configuration may allow a user to select the other configurations to use.

Embodiments in accordance with the present disclosure may provide a system and method to provide access to protected data for a communication terminal, the system including: a publisher database configured to store protected data in encrypted form; a publishing server coupled to the publisher database; an authentication server coupled to the publishing server, the authentication server configured to provide a cryptographically strong authentication of access to the protected data; an interface to a first secure channel, between the publishing server and the communication terminal; and an interface to a second secure channel, between the publishing server and a customer application, wherein the customer application is configured to accept and post information from and to the communication terminal via the first secure channel and the second secure channel.

A method in accordance with an embodiment of the present disclosure may include: storing, by a publishing server coupled to a publisher database, protected data in encrypted form; receiving, from the communication terminal, a request to access the protected data, the request comprising purported credentials; transmitting the purported credentials to an authentication server in order to authenticate the purported credentials by a cryptographically strong authentication; if the purported credentials are authenticated, granting access between the communication terminal and the protected data; communicating the protected data between a customer application and the publisher database; and communicating the protected data between the communication terminal and the publisher database.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 8 illustrates a process to start up and use an application on a communication terminal in accordance with an embodiment of the present disclosure; and FIG. 9 illustrates a process to synchronize and update an application in accordance with an embodiment of the present disclosure.

Figure 1:
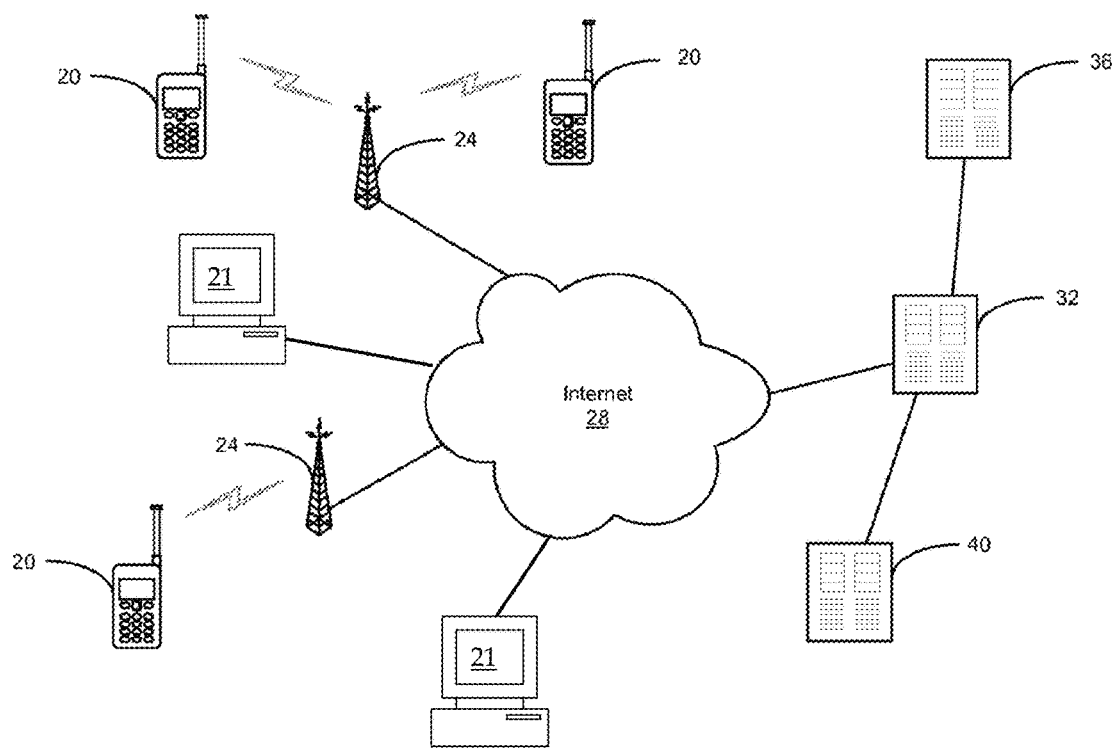
FIG. 1 is a block diagram depicting a mobile communication network in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary digital information system. Although well suited for use with, e.g., a system using a server(s) and/or database(s), the disclosure is not limited to use with any particular type of system or configuration of system elements. Those skilled in the art will recognize that the disclosed techniques may be used in any system or process in which it is desirable to provide a transferable permission to access information or control a decision.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participate in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1 illustrates a dispersed system of communication terminals (e.g., mobile devices and non-mobile devices) and associated users who use applications running on the communication terminals and may access sensitive personal information by use of the communication terminals. A number of mobile devices 20 are shown in communication wirelessly with cellular base stations 24 via cellular communications. The cellular base stations 24 enable communications over a large, public network, such as the Internet 28, via a number of intermediate servers operated by one or more cellular communications carriers (not shown). FIG. 1 further illustrates a number of non-mobile computing devices 21 in communicative contact with Internet 28. A transaction server 32 may also be in communication with the Internet 28. The transaction server 32 may also be in communication with a validation server 36 over a private network. Additionally, the transaction server 32 may be in communication with one or more repositories of, or systems that process, sensitive information such as medical or financial institutions 40 where the users of the mobile devices 20 and/or non-mobile computing devices 21 may have a relationship of some sort, such as business or health care.

Embodiments in accordance with the present disclosure are not limited to the types of mobile devices 20 and/or non-mobile computing devices 21 illustrated in FIG. 1. Embodiments may be used with substantially any type of input/output device or communication terminal including PCs, MacBooks, tablet computer, thin clients, or substantially any other type of computing device accessible via a network.

It should be emphasized the configuration of the elements as shown in FIG. 1 is for purposes of illustration only and should not be construed as limiting embodiments of the present invention to any particular arrangement of elements.

The server may be a software-controlled system including a processing unit (CPU), microprocessor, or other type of digital data processor executing software or an Application-Specific Integrated Circuit (ASIC) as well as various portions or combinations of such elements. The memory may comprise random access memory (RAM), a read-only memory (ROM), or combinations of these and other types of electronic memory devices. Embodiments of the present invention may be implemented as software, hardware (such as, but not limited to, a logic circuit), or a combination thereof.

Figure 2A:
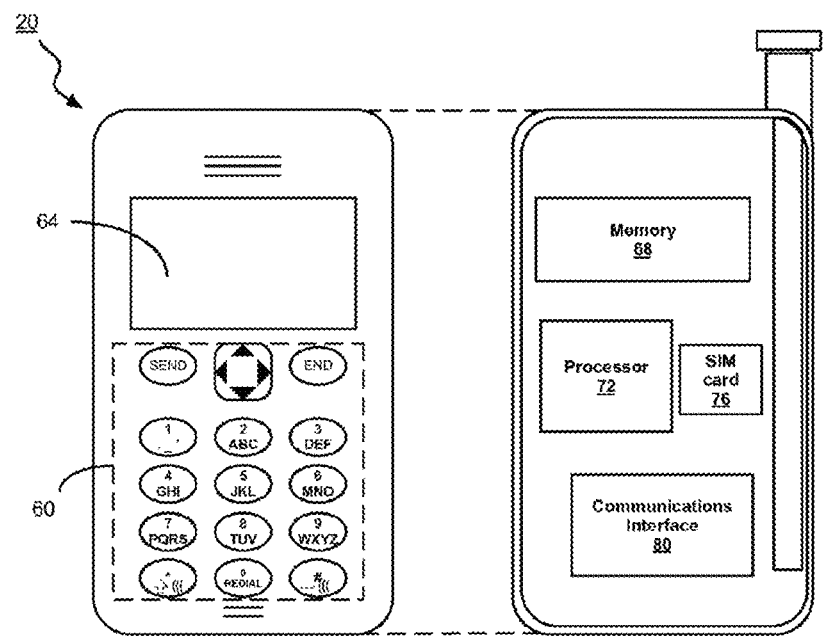
FIG. 2A is a system level block diagram depicting a mobile device in accordance with an embodiment of the present invention.

Referring to FIG. 2A, a number of components of the mobile device 20 are shown. As illustrated, in this embodiment, the mobile device 20 is a typical mobile phone having basic functions. The mobile device 20 has an input interface 60 for receiving input from a user, and a display 64 is provided for presenting information visually to the user. The mobile device 20 also includes memory 68 for storing an operating system that controls the main functionality of the mobile device 20, along with a number of applications that are run on the mobile device 20, and data. A processor 72 executes the operating system and applications. A SIM card 76 provides additional memory for storing applications and data, and has a microprocessor for executing them. Additionally, the SIM card 76 has a unique hardware identification code that permits identification of the mobile device 20. When installed, the SIM card 76 forms part of the mobile device 20. Other types of mobile devices can have encrypted device memory in place of the SIM card 76, which offers the equivalent functionality. A communications interface 80 permits communications with a cellular network for voice and data.

Figure 2B:
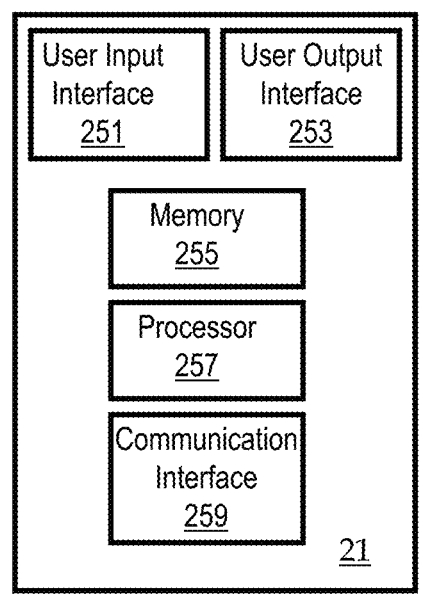
FIG. 2B is a system level block diagram depicting an end-user non-mobile device in accordance with an embodiment of the present invention.

Referring to FIG. 2B, a number of components of non-mobile computing device 21 are shown. As illustrated, in this embodiment, non-mobile device 21 is a typical desktop or tower computer having basic functions. Non-mobile device 21 has a user input interface 251 for receiving input from a user (e.g., a keyboard, touchscreen and/or microphone), and a user output interface 253 is provided for presenting information visually or audibly to the user. Non-mobile device 21 also includes memory 255 for storing an operating system that controls the main functionality of non-mobile device 21, along with a number of applications that are run on non-mobile device 21, and data. A processor 257 executes the operating system and applications. Non-mobile device 21 may have a unique hardware identification code that permits identification of non-mobile device 21 (e.g., a medium access control (MAC) address). At least a portion of memory 255 may be encrypted. A communications interface 259 permits communications with a LAN or Internet 28, e.g., by way of an Ethernet or Wi-Fi interface.

In contrast to tools and methods of the known art, which provide inadequate integration of security design among various system components, embodiments in accordance with the present disclosure include system components that are designed to integrate security design across components for more seamless interfacing, thus freeing developers of system components from having to worry much about security interfacing. Embodiments also protect information from access by unauthorized users.

Integration may provide synergies among loosely coupled applications. Loosely coupled means that the applications are not necessarily dependent upon each other. Any dependency that may exist should not affect the behavior of one application if the other (i.e., dependent) application is not present. Such applications may be used independently or together but, if they are used together, then they may communicate with each other. For example if two applications are cooperating in the container, and one of the applications is updated after a synchronization process, the other application will not be affected, but the cooperative work may be affected. A loosely-coupled relationship between applications may be achieved by sharing optional data between them. When shared applications are present, both applications will interact using the shared data.

Embodiments in accordance with the present disclosure provide a mobile application development platform that includes integration of features not available in integrated form in development platform of the known art. Embodiments may allow software application developers to create more secure mobile applications using common development tools such as HTML, CSS and JavaScript, without a need to have detailed technical knowledge of different mobile platforms software development environments, or to be experts in security or mobile communications. Embodiments may provide integrated end-to-end security with tools needed to create sophisticated client/server applications. Embodiments may provide a method to synchronize and/or update digital content in a mobile app client by communicating with a backend server, the method being useful for restoration (e.g., if the mobile device is lost and replaced, or if a software upgrade produces an unanticipated problem). The mobile application development platform also provides a secure mobile storage, which is useful for using a mobile app when the mobile app is not connected to the internet.

A customer application in accordance with an embodiment of the present disclosure is a server side application that may communicate with a publisher (e.g., a publishing server) in order to send and receive information from a mobile device. A publishing server may be illustrated, for instance, as transaction server 32 of FIG. 1. A mobile application in accordance with an embodiment of the present disclosure is an application built for a client (either a mobile or non-mobile client), and may provide an interface with an end user. For example, a mobile application may include a diabetes application to track glucometer readings, and a corresponding customer application may be include a server-based program (e.g., an electronic medical record (EMR) program) that receives and process the glucometer readings.

Embodiments in accordance with the present disclosure may provide a communication path and relatively well defined interfaces between mobile app clients and a backend server. A single developmental effort of a mobile app client may be leveraged into mobile app clients that can run on a respective variety of mobile platform operating systems (e.g., Android, Windows Mobile, iOS, etc.). A generic server may be used to host a back-end server application that uses the interfaces provided as part of the embodiments in order to communicate with the mobile app client.

The interfaces between mobile app clients and a backend server may include several levels of interfaces. For example, a client application may use JavaScript interfaces to access a secure store in a mobile device. A server side application (e.g., a customer application) may use a secured communication interface such as a Web Service Interface (SOAP configured using SOAP standard security features) to communicate with a publishing server. SOAP is known as a W3C Recommendation produced by the XML Protocol Working Group, which is part of the Web Services Activity, as known by persons of ordinary skill in the relevant art. The current version is SOAP 1.2, dated Apr. 27, 2007. Embodiments in accordance with the present disclosure link together a secure store in the mobile device with the publishing server, thus providing a communication link between a mobile device application and a customer application. The technology used for the interfaces may include other types of interface technologies.

Embodiments in accordance with the present disclosure may provide a process to use the mobile application development platform, such that users download only once a container from an app store. The container may hold several application configurations, and a mobile device uses a configuration appropriate to the mobile device and user preferences to present the user GUI, flow, logic and data accordingly. Thereafter, application configurations updates are made directly from the associated servers. This enables users to obtain the latest version of the application configurations at the next time the application program used by the user, to access the server. For example, the container may contain a description of the user GUI, flow, logic and data for a predetermined mobile device in terms of code such as HTML/CSS or JavaScript. The container may interpret the code that is appropriate for the mobile platform, and provide the user GUI, flow, logic and data for the mobile platform.

For example, when a container connects to a server, the container receives application configurations. The first application configuration initially may be used by the container, and allows the user to begin working with the application. An application configuration is a set of descriptors, logic and data structures that are sent by the server to the container. The descriptors, logic and data structures may be implemented or communicated in a variety of ways, for example using HTML, CSS, JavaScript and JSON. Other technologies may also be used.

The container receives the latest configuration stored in the server. The server may update the configuration at any time, and if the configuration is updated then the container will receive the latest (i.e., up-to-date) version. Containers may connect to several servers. When the container is initialized (e.g., by provisioning of an activation code), the container may identify an associated server and then initiate communication with the associated server. Once the associated server is chosen, the container will always use the associated server. In some embodiments, the mobile device may be configured to communicate with a plurality of associated servers, e.g., if one associated server is not available, then successively communicate with another associated server.

Embodiments in accordance with the present disclosure may provide an interface to an external application (e.g., a "customer application"), which is able to accept and post information from and to the mobile device via the publishing server. A customer application is a server application that communicates with a publishing server to send and receive information from mobile clients. Customer applications may connect to the publisher using a secured Web Service Interfaces (SOAP). An example of a customer application may include an EMR system that uses the WSI interface of a publishing server to exchange information with mobile users. The mobile application development platform may store substantially all information from the customer application that is published to the mobile device in a secure database, accessible by the mobile application development platform, in order to help decouple the customer application from the mobile application and to be able to restore a user's information (in case of information lost in the mobile) without intervention the customer application.

The customer application development platform allows at least two different types of customer applications: Interactive applications and polling applications. For interactive applications, a customer application will be notified when data associated with the customer application is modified in the publisher database (e.g., publisher database 402 of FIG. 4). For polling applications, the polling customer application periodically examines what information in the platform database has been modified, and then retrieves the data and processes it in order to carry out the purpose of the customer application. Interactive customer applications may be online or offline since the platform provides a queuing mechanism to allow customer applications to have their own life cycle.

The customer application ordinarily is a computer service that is connected to a publishing server and may be receiving notifications from the publishing server. During certain periods of time the customer application may be offline (e.g., out-of-service) because a maintenance cycle or a communication failure. During the offline period of time, users using mobile applications may still change information (e.g., update/add/remove data etc.), and the publishing server still needs to notify the customer application about the changes. However, because the customer application is offline, the customer application cannot receive the notifications. In order to prevent loss of notifications, embodiments must queue the notifications, and when the customer application service is back online, the queue will start delivering the notifications about all the changes that happened during the offline time. Life cycle refers to a schedule of updating a customer application and making the updated customer application accessible to mobile application users. Although a life cycle is described herein in terms of online and offline phases, in addition other phases may be used or available.

The mobile application development platform may support one or more organizations, user groups, and applications. Each organization will have its own set of user groups and applications and members of such user groups may be afforded more trust or access to application configurations compared to entities not within the user group. Some user groups may have access to a first set of application configurations and other groups may have access to a second set of application configuration. Multiple organizations may be useful when one system is shared among multiple customers, e.g. hospital ABC and hospital XYZ. Patients of hospital ABC may form a first group, staff members may form a second user group, while hospital XYZ may have a different user organization. Although the two organizations use the same computing and communication equipment (e.g., servers), the users, applications and data of the various groups are independent of each other. Such multi-organization usage of resources may be referred to as multi-tenant usage. Access control is used to prevent unauthorized access among the organizations, user groups, and applications. The access control is based on access privileges assigned by an administrator among user groups and applications.

Embodiments may support out-of-band user registration or in-app user registration where available. Out-of-bad user registration occurs when a customer application allow users to be registered. In this case, the registration is done via a customer portal or by an automatic registration from another system such as a human resources system, and not using the mobile application. In contrast, in-app user registration enables a user to self-register from the mobile application.

The mobile application development platform may support multiple application configurations that are designed to work together by sharing data, status, and user preference. An application configuration may include a dataset used by the application, which in addition may be shared with other application configurations. Sharable application configuration datasets gives developers flexibility to build complex applications modularly or to build multiple segregated applications, each of which may be working relatively independently from other segregated applications. Such applications may be referred to as cooperative applications or loosely-coupled applications.

From a user data perspective, the mobile application development platform acts upon a "document", such that a document may be substantially any type of data with substantially any type of structure (e.g., measurements, documents, spreadsheets, text, graphs, images, audio, video, streaming media, etc.). Optionally, substantially each document may be identified by one or more labels or tags that are provided when the document is created or updated. Labels and tags may be system-provided to ensure uniqueness, or may be user-provided to help ensure a memorable naming convention. The labels or tags may be used to index, identify, and find individual documents easily. In some embodiments, a document may retain its label or tag when the document is updated. In some embodiments, labels and tags may be managed (e.g., changed, added, removed) by a user. Labels and tags may be used to indicate a type of data that the document contains (e.g., MP4 video). The way that mobile applications act upon the data is not limited. For example, if the data includes HTML/CSS/JS code, then the mobile application may be configured to render the data in a format that is appropriate for the data.

In some embodiments in accordance with the present disclosure, mobile users may register with a customer service entity using an out-of-band communication mechanism (e.g., a secondary communication channel such as a web portal or in person), in order to acquire an activation code that would be used to activate the application, or to use the mobile application with additional features or benefits that are available to registered users. In other embodiments in accordance with the present disclosure, a controller application may control user registrations in the system and provide activation code to the user to enable the user to activate the mobile application. Although this second option is similar to the first one, it differs in that the user is already registered in other systems, before becoming registered to the publishing server. In other embodiments in accordance with the present disclosure, activation may be performed from the mobile application itself, such that a user of the mobile device will use the mobile application to first request and receive an activation code out of band (such as via email or SMS text message), and then entering the received code to activate the application and be able to proceed with the functionality that is activated.

A problem addressed by various embodiments is how to develop inherently secure mobile applications, for both online and offline usage, without incurring a burden of writing separate software code for each mobile platform. Furthermore, the mobile applications should be designed and operate in accordance with substantially all security standards and specifications relevant to secure data applications. With respect to other mobile applications developed by using the mobile application development platform, desirable characteristics include that the mobile applications should be collaborative, be able to share data with each other, should be modularly sharable and uploadable to mobile devices, and may be dynamically updated. The mobile application development platform may use a GUI description language and be able to support a scripting language(s).

Embodiments in accordance with the present disclosure enable the development and support of mobile applications that handle or process sensitive information (e.g., health applications for patient and consumer use), and incorporate the desirable characteristics identified above. Embodiments may allow an entity that needs access to the sensitive information (e.g., a medical service provider) to obtain more in-depth knowledge related to the sensitive data, such as improved understanding of patient behavior, adherence to prescribed or recommended medications, and impact of drug therapy on patient health. Embodiments described herein enable development of mobile applications that engage the interest of persons such as a patient, and motivate the patient to enter their data with confidence. A mobile application for health applications will be a HIPAA compliant application, in order to help ensure that patient information will be protected from exposure or misuse.

Because mobile applications should engage the interest of a patient, the mobile applications and their content should be updated and improved relatively frequently in order to adjust to the changing patient use, needs and expectations, and thus continuing to engage their interest. Often, users should be aware of the benefits of the updates and improvements. Thus, in the case of health applications, by providing one simple but integrated mobile application that tries to solve many or all a user's medical-related needs, the user may become more engaged in using the mobile application. Improved patient health may result as a patient becomes more engaged in their own health care.

Embodiments in accordance with the present disclosure may provide a mobile application development platform that allows an application developer to develop mobile applications having at least the following characteristics of the mobile application or the mobile application development platform:

Embodiments may support download of application configuration information, data, settings, etc., by use of a strong transmission security protocol that is independent of secure sockets layer (SSL). The secure transmission mechanism may also be used on top of an extra SSL layer.

Embodiments may support the development of mobile applications that require a permanent internet connection (WiFi, 3G, 4G, 5G, etc), no internet connection or sporadic internet connection.

Embodiments may support an ability to download from an app store a container that will be able to support the execution of multiple application configurations in the same container.

Embodiments may support an ability to download from a server multiple application configurations for respective different types of users.

Embodiments may support an ability to configure multiple application configurations per user without a need to install other applications, and without a need to obtain a different or updated version of the mobile application for the device.

Embodiments may support an ability to provide multiple mobile application configurations in order to share data or to have independent datasets. A dataset may be a predefined logical location or classification in which users may store information. Datasets may be hierarchical and/or recursive. Datasets may be different per application or they may be shared between applications. Datasets may be grouped together in Datagroups. For example, a single user may have different documents in different datasets within his logical space, e.g., a PHI document in a PHI dataset and a blood pressure measurement document in a Measurements dataset. Different users may have different logical spaces or relational structure thereof (e.g., folder tree, or parent/child folder relationships), even though they may have similar document in the same datasets.

Datagroups are associated with customer applications using a customer application URL entry point. Customer applications may be subscribed to the datagroups from which they need to get notifications. The subscribed customer application may be notified when a document of a dataset associated with the datagorup is created, modified or deleted.

Embodiments may support an ability to develop mobile applications that use strong secure storage to store configuration, logic and data. Strong storage refers to cryptographic strength of encrypted storage. Such strong secure storage often uses AES or other, similarly strong security standards.

Embodiments support an ability to develop mobile applications that are able to track user data changes and user data interactions in both a client and a server.

Embodiments may provide integrated server interactions in order to support data restoral, security credentials restoral, sharing data between users, and allow portals in order to interact with user information in the same platform. An integrated server interaction exists when a publishing server provides a WSI interface that allows customer applications to interact with it. The WSI interface may be used to integrate a server with a customer portal, or to integrate the server with customer applications such as legacy apps, etc. A portal is known as an application program that allows an end user to interact with a remote system. A portal may also be referred to as a Web application.

Embodiments may provide an integrated mechanism (e.g., a communication interface) for an external server to receive notifications of some or all user changes, and to be able to retrieve and push user information via the provided Web Service Interface. Such servers may be used to publish information to mobile devices and receive information from mobile devices. For example, the external servers receive and process information sent from the mobile devices. The server would communicate with a publishing server, using a secured Web Service Interface (WSI), and retrieve the information generated in the mobile device. WSI is known as a middleware of calls, parameters and data structure based in the SOAP standards. Embodiments in accordance with the present disclosure use SOAP standards in order to communicate with the publishing server.

Embodiments may support automatic erasure of secure information on a mobile device when a device is reported lost or stolen. The erasure may be initiated remotely, via an over-the-air wireless command or after several invalid attempts to enter a password. Thereafter, to activate a new device, a user may receive an activation code and then synchronize the device with the publishing server in order to restore the secure content that was stored in the old, now-erased device. Embodiments use security features to ensure that it is not possible to clone a secure data store, i.e., a data store cannot be replicated without first erasing a device that held the data store or acquiring a new activation code.

Embodiments may provide full legal and regulatory compliance in order to protect confidential information, e.g., HIPAA, Defense Information Assurance Certification & Accreditation Process (DIACAP), and other compliance regimes that may be used in the future.

Embodiments may provide multi-tenant support and multiple user group support.

Embodiments may support the granting of access rights, by members of a user group, to applications developed by embodiments in accordance with the present disclosure.

Embodiments may support the granting of access rights, by users, to data belonging to other users with the purpose of reading, updating, deleting, or sharing the data belonging to other users, in accordance with the present disclosure.

Embodiments may provide a secure communication path between external servers (e.g., customer applications) and mobile devices. A developer of a customer application and mobile application configurations do not need to be familiar with the specific implementation.

Embodiments may support different both interactive and polling schemes for updating customer applications when data associated with the customer application is modified in the platform database.

Embodiments may provide an ability to extend application program interfaces (APIs) to support native and hybrid applications that use newer mobile device features.

Embodiments may support use of document abstraction for user data, and provide an ability for a user to add tags to a document meta information in order to improve future searching performance. Document abstraction helps make embodiments independent from the information that is transmitted by the system. A document may be substantially any type of content that will have a meta-information field that may indicate searchable tags, information type, etc. This information is of concern mainly to a customer application server and to the corresponding application configuration.

Embodiments may provide an ability for customer applications to use a platform database and/or for customer applications to have their own database.

Embodiments may support other communication protocols (e.g., Bluetooth), and support other external devices such as biometric devices.

Embodiments may include a publishing server that is configured to receive at substantially any time a user-profile management request from a customer application. After creation of a user-profile, the publishing server may register the user profile and acquire an activation code from an authentication server. The authentication server may be illustrated, for example, as validation server 36 of FIG. 1. The activation code may be provided to the customer application.

Embodiments may include a publishing server that is configured to receive at substantially any time a user registration request from a mobile device. After receipt of the user registration request, the publishing server may request an authentication code from an authentication server and provide the authentication code to the mobile device. After receipt of the authentication code, the mobile device may proceed with an activation process.

Embodiments may include a mobile device that is configured to use a user password, received security credentials and internal mobile information to derive an encryption key for the secure storage, without storage of password or encryption keys in the mobile device.

Embodiments may include a publishing server that is configured to queue and deliver notifications to customer application when corresponding data is affected (e.g., created, update, or deleted).

Embodiments may include a publishing server that is configured to accept Secured Web Service Interface calls to retrieve or post information from customer applications, allowing an application to access only the information that the application is assigned to monitor. The application may poll for changes or can react to publisher notifications.

Embodiments may include a mobile device that includes a biometric reader (e.g., fingerprint reader, iris scanner, etc.). The mobile device may further include a short-range radio interface such as Wi-Fi, Bluetooth, ZigBee, near-field communications (NFC) and so forth.

Embodiments may include a mobile application that comprises modules to provide auditing and logging functions to developers. Substantially every operation of the system may be logged for auditing purposes.

Embodiments may include a publishing server that is configured to maintain a secure history of changes to user data.

Embodiments may include a publishing server that is configured to publish information in support of a plurality of mobile devices, independently of each other.

Embodiments may include a publishing server that is configured to self-monitor and to detect malfunctioning modules or exceptional errors (e.g., an error that produces a processor fault or operating system fault, and does not include data transmission errors). The publishing server may notify an administrator of malfunctioning modules or exceptional errors.

Embodiments may include a publishing server that is configured to manage document attachments, using a lazy download technique and secure download mechanisms. A lazy download technique may be known as a technique in which an attached document is downloaded only if and when the recipient user needs to access the document.

Embodiments may include a publishing server that is configured to mange streaming multi-media and large data.

Embodiments may include a publishing server that is configured to provide another set of interfaces that allow inversion of control (IOC) to communicate with customer modules. The customer modules may be seen as part of the publishing server, but may contain customer logic that uses the publishing server APIs and resources to operate. The publishing server may use the customer modules when needed, for example, to let the customer modules to know that information from a user has arrived to the system.

Embodiments may include a publishing server that is configured to provide integration with user-management and authentication mechanisms, such as Lightweight Directory Access Protocol (LDAP), Windows™ Active Directory and so forth. LDAP is known as an open, vendor-neutral, industry standard application protocol for accessing and maintaining distributed directory information services over an Internet Protocol (IP) network.

Figure 3:
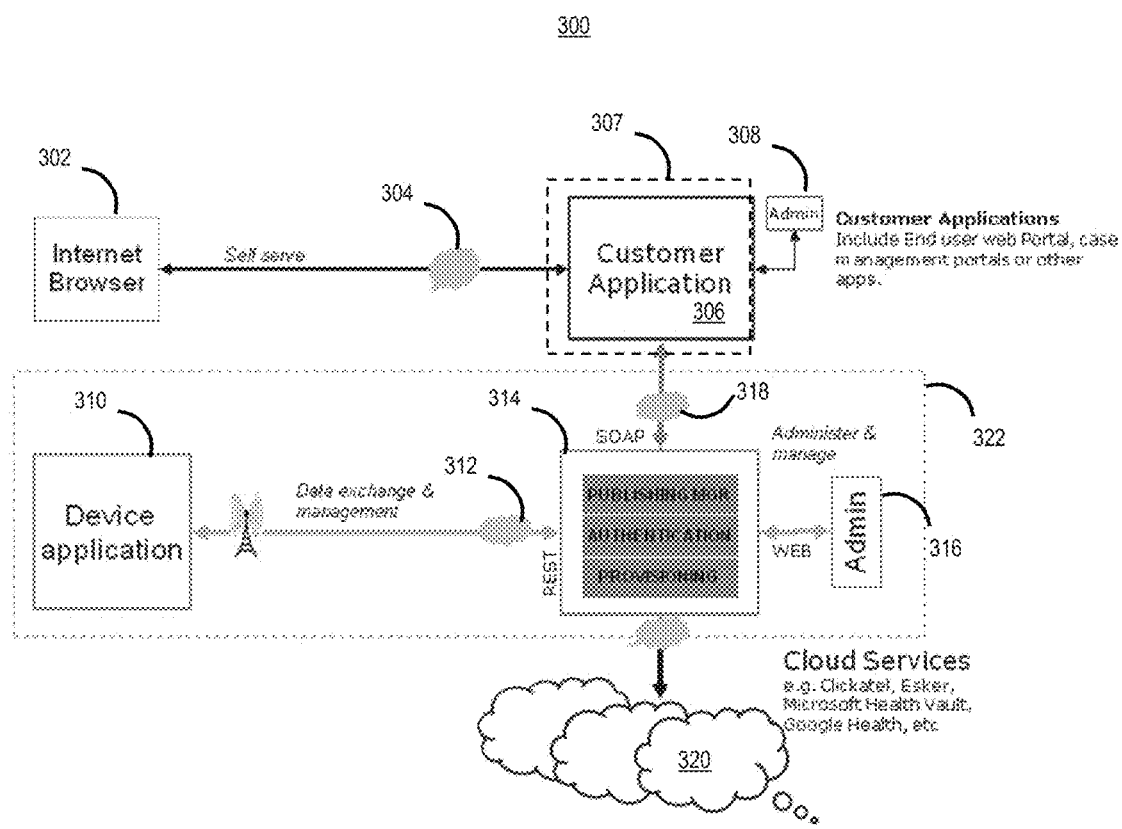
FIG. 3 illustrates a global view of a system 300 in accordance with an embodiment of the present disclosure.

FIG. 3 illustrates a global view of a system 300 in accordance with an embodiment of the present disclosure. System 300 includes two major device application 310 and computing device 307. The components that computing device 307 interact with, and the device application 307 component itself, are examples of a customer server application. In this customer subsystem, device application 307 provides an interface 304 to an internet browser 302 that is used by a customer to allow users to access the customer application 306 residing on or in a computing device 307. Computing device 307 includes a processor coupled to a memory, the memory configured to store instructions that, when carried out by the processor, will provide the functions of customer application 306. Customer application 306 and/or computing device 307 may include or be hosted by a server computer. Customer application 306 may represent one or more individual applications, such as an end-user web portal, case management portal, and so forth. In some embodiments, computing device 307 may also provide the computing platform on which internet browser 302 runs. In some embodiments, an administrator interface 308 may be provided to computing device 307 or 306 in order to configure or control the configuration of the computing device 307 or customer application 306

System 300 further includes computing device 322. Computing device 322 includes a communication interface 318 between site 314 and the customer subsystem 307, 306. Communication interface 318 may include an Ethernet interface to a LAN or WAN such as the Internet. At a networking layer, communication interface 318 may use a secure communication interface such as Simple Object Access Protocol (SOAP), using standard SOAP security features, where security of the protocol does not depend on SSL. SOAP is known to persons of skill in the art as a lightweight protocol (i.e., not computationally intensive) for exchange of information in a decentralized, distributed environment. SOAP is an XML based protocol that includes three parts: an envelope that defines a framework for describing what is in a message and how to process it, a set of encoding rules for expressing instances of application-defined data types, and a convention for representing remote procedure calls and responses. SOAP can potentially be used in combination with a variety of other protocols, and bindings are known by persons of ordinary skill in the art that describe how to use SOAP in combination with HTTP and HTTP Extension Framework.

The server 314 is configured to communicatively interface with communication interface 318, and act as a server for various server applications such as a publishing manager server, an authentication server, and a provisioning server. Server 314 may support a communication interface 312 to device application 310. Device application 310 may support or execute the client portion (or container) with one or more application configurations, the client portions of which may execute on computing device 307. Device application 310 may be configured to provide secure (i.e., encrypted) storage of protected information, and to provide secure communication via communication interface 312. In some embodiments, device application 310 may be provided within server 314. Server 314 may further include an interface (e.g., a web interface) to an administrator 316. Administrator 316 may be used to configure or control the configuration of server 314 and/or device application 310. Server 314 may further include a communication interface to cloud-based health-related services 320 known in the art such as Microsoft Health Vault™, Google Health™, etc., and other services such as Clickatel™ and Esker™, for messaging, fax, and so forth.

Figure 4:
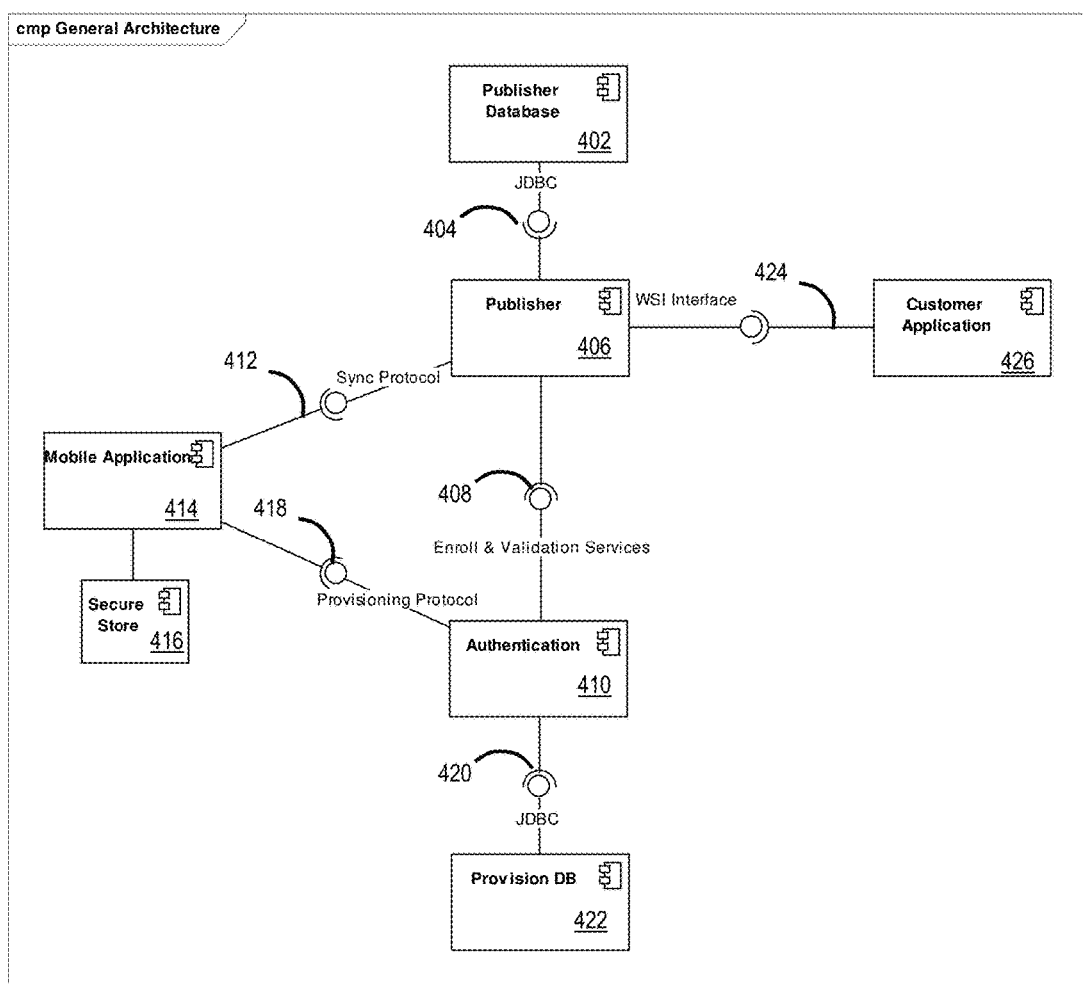
FIG. 4 illustrates at a relatively greater level of detail an internal architecture and exposed interfaces of a development platform in accordance with an embodiment of the present invention.

FIG. 4 illustrates at a relatively greater level of detail an embodiment 400 of an internal architecture and exposed interfaces used by server 314, in particular for a user of mobile application 414 that communicates with a publishing server 406 and an authentication server 410. In some embodiments, a single server may be used to implement publishing server 406 and an authentication server 410.

Mobile application 414 and/or computing device 322 may be communicatively coupled to secure store 416. Secure store 416 may also be hosted by computing device 322. Computing device 322 may also include an internal secure web server and browser used to manage local web configuration and business logic.

Publishing server 406 may be communicatively coupled to authentication server 410 via communication interface 408. Communication interface 408 may be further configured to support email services and validation services between publishing server 406 and authentication server 410.

Furthermore, publishing server 406 may be communicatively coupled to publisher database 402 via communication interface 404. Communication interface 404 may be further configured to support the Java Database Connectivity (JDBC) protocol. JDBC is known in the art as a standard protocol for database-independent connectivity between the Java programming language and a wide range of databases, SQL databases and other tabular data sources, such as spreadsheets or flat files. The JDBC API provides a call-level API for SQL-based database access. Other communication protocols may also be used for communication interface 404.

Furthermore, publishing server 406 may be communicatively coupled to customer application 426 via communication interface 424. Communication interface 424 may be further configured to support the web services interfaces (WSI) protocol. WSI is known in the art as an XML-based tool that functions similarly to an API, allowing developers to carry out a myriad of tasks in bulk, or from remote systems, without having to make source code modifications. Other protocols may also be used for communication interface 424 (e.g., JDBC, REST, etc.), and embodiments are not limited in this regard.

Authentication server 410 may be communicatively coupled to provisioning database 422 via communication interface 420. Communication interface 424 may be further configured to support JDBC. Other protocols may also be used for communication interface 420, and embodiments are not limited in this regard. Provisioning database 422 may be used to store profiles, settings, and other information relevant to embodiment 400 and also to store and distribute mobile applications if necessary, using device auto-detection.

In operation, mobile application 414 and/or computing device 322 may receive web configuration and logic from publishing server 406 and security credentials from authentication server 410 using an over the air mechanism (e.g., a wireless communication channel) via communication interface 412 and communication interface 418, respectively, and by use of cryptologically strong authentication and encryption methods.

Computing device 322 may be designed to store web configuration and logic in secure storage 416. The secure web server in computing device 307 serves pages requested by local secure browser in order to render the web configuration and logic to a user or other controller for review and change if required. When the secure browser is in operation, no communication with an external server is needed, allowing applications in computing device 307 to work offline and maintain information secured in secure storage 416. Configuration and logic served by the internal web server may use substantially any kind of language to describe data structure, presentation mechanism and logic. For example, configuration and logic may be expressed in JavaScript Object Notation (JSON), HTML and JavaScript respectively. Embodiments are not limited in this respect, and other embodiments may use other computing languages or protocols. Data, configuration and logic stored in secure storage 416 may be synchronized with, and updated from, publishing server 406 during start up of the application 414, or by user request, or upon a periodic schedule. Publishing server 406 may include an ability to accept requests from a user via customer application 426 for users who have permission to access the user's data. Users may post or read information stored in the publishing server secure database 402. Users may share information in secure database 402 according to predetermined security rules.

Users may access information from a mobile device such as computing device 307, or from a conventional internet browser. Administration tools available to publishing server 406 allow the management of data security for published data, and manage the ability of users and devices to access the published data. Communication between a client and a server is intrinsically secure because of encryption (e.g., AES) and does not depend only on SSL. Mobile applications 414 can be restored to a previous operating state in a new device if the original mobile device is lost or stolen. The original mobile device may be automatically disabled, and all data in secure storage 416 may be automatically deleted.

Figure 5:
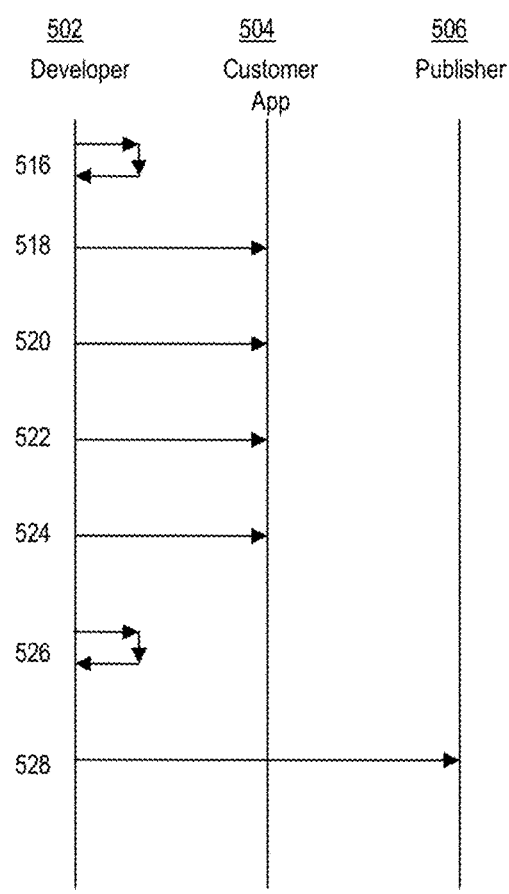
FIG. 5 illustrates a process to publish an application in accordance with an embodiment of the present disclosure.

FIG. 5 illustrates a process 500 to publish an application in accordance with an embodiment of the present disclosure. Process 500 is depicted as a message sequence diagram between developer 502, customer application 504 and publisher 506 (e.g., publishing server 406), with time progressing from top to bottom of FIG. 5. Individual messages are referenced by a reference number located near the origin of the respective message. Mobile application 414 and server application (e.g., a customer application) do not communicate directly. Instead, publisher 506 acts as a middleware with storage.

Process 500 begins at step 516, at which developer 502 may create or modify an application. During this time, the customer application ordinarily is not generally accessible or usable by others. Step 516 may iterate indefinitely. When the developer is done creating or modifying the customer application, sufficiently for the application to be published, step 516 will conclude.

Next, control of process 500 transitions to step 518, at which developer 502 may configure the customer application in order to be deployed, or otherwise made generally available, by publisher 506 (e.g., publishing server 406).

Next, control of process 500 transitions to step 520, at which developer 502 may configure the customer application in order to identify the data groups that the customer application has permission to access or modify, or be a member of.

Next, control of process 500 transitions to step 522, at which developer 502 may configure the customer application in order to identify the datasets that the customer application has permission to access or modify.

Next, control of process 500 transitions to step 524, at which developer 502 may configure the customer application in order to be able to register the customer application with publisher 506.

Next, control of process 500 transitions to step 526, at which developer 502 may create, modify or save a mobile application configuration. The configuration may include data set and data group associated with the application. Step 526 may iterate until sufficient modification of the configuration are needed. When the developer is done creating, modifying or saving the configuration, sufficiently for the application configuration to be published, step 526 will conclude.

Next, control of process 500 transitions to step 528, at which developer 502 communicates with publisher 506 so that the application configuration is posted and made generally available for use by mobile containers.

Figure 6:
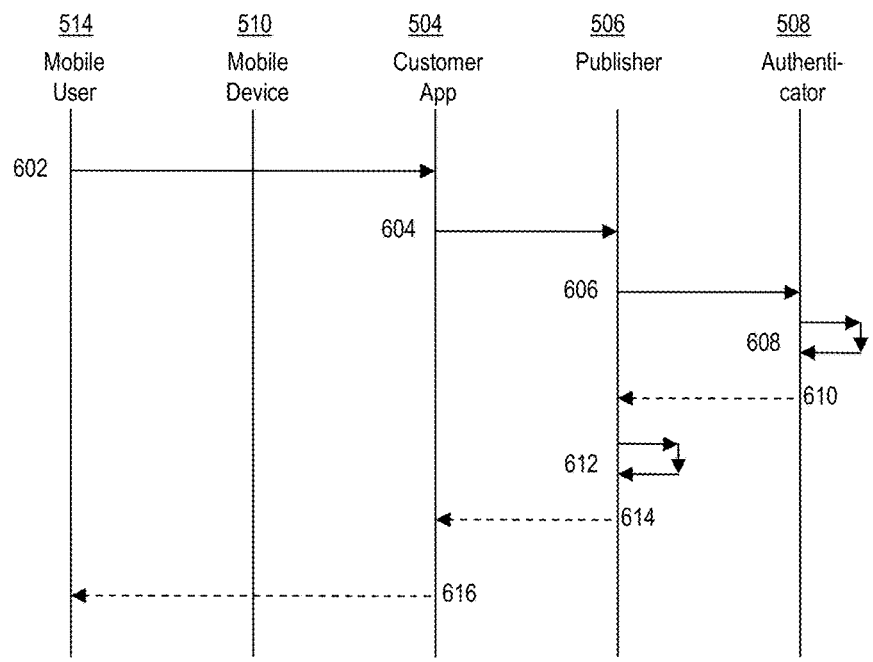
FIG. 6 illustrates a process to register a user with an application in accordance with an embodiment of the present disclosure.

FIG. 6 illustrates a process 600 to register a user with an application in accordance with an embodiment of the present disclosure. Process 600 generally provides a cryptographically strong authentication method for a mobile user 514 to provide purported credentials (e.g., a one-time password (OTP)), have the purported credentials authenticated by the authenticator 508, and to have authenticator 508 generate provide a certification (e.g., a digital certificate, activation code, or the like) that certifies that the purported credentials are authentic, thereby granting access, privileges, or the like to mobile user 514. Process 600 is depicted as a message sequence diagram between customer application 504, publisher 506, authenticator 508 (e.g., authentication server 410), mobile device 510 (e.g., computing device 307), and mobile user 514, with time progressing from top to bottom of FIG. 6. Individual messages are referenced by a reference number located near the origin of the respective message.

Process 600 begins at step 602, at which a registration request (or equivalent) is sent from mobile user 514 to customer application 504. The registration request message includes credentials that identify the requesting mobile user 514.

Next, control of process 600 transitions to step 604, at which a Create User and Post Data( ) message (or equivalent) is sent from customer application 504 to publisher 506.

Next, control of process 600 transitions to step 606, at which publisher 506 may send a User Registration request message to authenticator 508. The User Registration request message includes the credentials that identify the requesting mobile user 514. Step 606 is useful to request that authenticator 508 authenticate the credentials provided by mobile user 514 and create secure credentials.

Next, control of process 600 transitions to step 608, at which authenticator 508 may authenticate the credentials provided by publisher 506. If the credentials are authenticated, then authenticator 508 may create secure credentials, and may create an activation code. The activation code is intended to be used by mobile user 514 in order to start using the customer application.

Next, control of process 600 transitions to step 610, at which an Activation Code message (or equivalent) is returned from authenticator 508 to publisher 506.

Next, control of process 600 transitions to step 612, at which after publisher 506 has received the activation code, publisher 506 may internally create or activate the user and return.

Next, control of process 600 transitions to step 614, at which the activation code message may be sent from publisher 506 to customer application 504. Step 614 is useful to inform customer application 504 that mobile user 514 is now authorized to use customer application 504 or access data controlled by customer application 504.

Next, control of process 600 transitions to step 616, at which customer application 504 may provide the activation code to mobile user 514, so that mobile user 514 is aware that he/she is now authorized to use customer application 504 or access data controlled by customer application 504.

Figure 7:
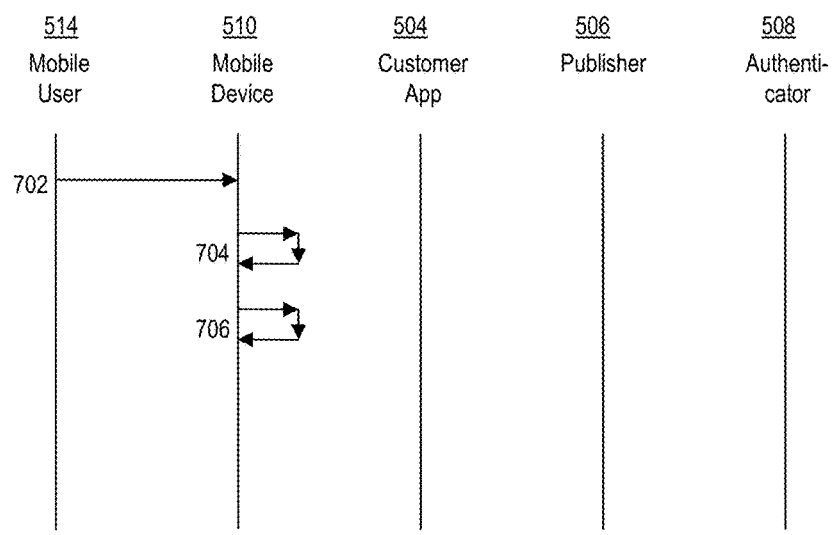
FIG. 7 illustrates a process to search for an application in accordance with an embodiment of the present disclosure.

FIG. 7 illustrates a process 700 for mobile user 514 to search in app store 512 for an application that is not already available on mobile device 510. Process 700 is depicted as a message sequence diagram between mobile device 510 (e.g., computing device 307), and mobile user 514, with time progressing from top to bottom of FIG. 7. Individual messages are referenced by a reference number located near the origin of the respective message. Process 700 assumes that a desired app is not already available on mobile device 510.

Process 700 begins at step 702, at which mobile user 514 controls mobile device 510 in order to search for a desired container in app store 512. Mobile device 510 is communicatively coupled to app store 512. Control may be by way of, e.g., direct manipulation by mobile user 514 of a control on mobile device 510, or by the sending by mobile user 514 of a Search Container in App Store( ) command (or equivalent) to mobile device 510.

Next, control of process 700 transitions to step 704, at which mobile device 510, after locating the requested app in app store 512, downloads the requested app from app store 512.

Next, control of process 700 transitions to step 706, at which mobile device 510 installs the requested app downloaded during step 704.

FIG. 8 illustrates a process 800 to start up and use, by mobile user 514, an application on mobile device 510 for which mobile user 514 has been authorized to use, in accordance with an embodiment of the present disclosure. Process 800 is depicted as a message sequence diagram between customer application 504, publisher 506, authenticator 508 (e.g., authentication server 410), mobile device 510 (e.g., computing device 307), and mobile user 514, with time progressing from top to bottom of FIG. 8. Individual messages are referenced by a reference number located near the origin of the respective message.

Process 800 begins at step 802, at which mobile user 514 controls mobile device 510 in order to indicate a desire to start using an application that is available on mobile device 510. The indication may be by way of, e.g., direct manipulation by mobile user 514 of a control on mobile device 510, or by the sending by mobile user 514 of a Start Container command (or equivalent) to mobile device 510.

Next, control of process 800 transitions to step 804, at which mobile device 510 responds to the request in step 802 by sharing the Activation Code (or equivalent) with mobile user 514, in order to allow mobile user to use the application program.

Next, control of process 800 transitions to step 806, at which mobile user 514 may respond to the message of step 804 by entering the activation code (or equivalent) to mobile device 510, which contains a purported activation code to be used to activate the application.

Next, control of process 800 transitions to step 808, at which mobile device 510 sends a Get-Secure-Credentials (Activate Code) command (or equivalent) to authenticator 508 in order to authenticate the purported activation code supplied by mobile user 514.

Next, control of process 800 transitions to step 810, at which authenticator 508 will attempt to authenticate the purported activation code supplied by mobile user 514.

Next, control of process 800 transitions to step 812, at which authenticator 508 may send a Secure-Credential response (or equivalent) to mobile device 510 if the purported activation code supplied by mobile user 514 had been authenticated in step 810 as being authentic.

Next, control of process 800 transitions to step 814, at which mobile device 510 may initialize its secure storage based upon the authenticated credentials and the indication from authenticator 508 in step 812 that the credentials were authentic.

Next, control of process 800 transitions to step 816, at which mobile device 510 may send a Synchronization request (or equivalent) to publisher 506 in order to synchronize between mobile device 510 and publisher 506 the data or code used by the application.

Next, control of process 800 transitions to step 818, at which publisher 506 may send a notification message to customer application 504 in case the data or code used by the application had been changed as a result of message 816.

Next, control of process 800 transitions to step 820, at which publisher 506 may send an Application Configuration and Data( ) message (or equivalent) to mobile device 510 in order to make sure that mobile device 510 has the current version of the application, as well as the current data associated with (or used by) the application.

Next, control of process 800 transitions to step 822, at which mobile device 510 may store in its secure storage the Application Configuration and Data information that had been received from publisher 506 via the Application Configuration and Data( ) message (or equivalent) described above in step 820, Next, control of process 800 transitions to step 824, at which mobile device 510 may execute the application received in step 820 using the data received at step 820.

FIG. 9 illustrates a process 900 to synchronize and update a configuration application and data on mobile device 510 for which mobile user 514 has been authorized to use, in accordance with an embodiment of the present disclosure. Process 900 is depicted as a message sequence diagram between customer application 504, publisher 506, mobile device 510 (e.g., computing device 307), and mobile user 514, with time progressing from top to bottom of FIG. 9. Individual messages are referenced by a reference number located near the origin of the respective message.

Process 900 begins at step 902, at which customer application 504 sends a request to publisher 506 by way of a Retrieve Updates( ) message (or equivalent) in order to request that customer application 504 receive any code or data updates that are relevant to customer application 504.

Next, control of process 900 transitions to step 904, at which, if there are any updates available, publisher 506 may send a User-Updated-Data( ) response message (or equivalent) to customer application 504 in order to transmit any code or data updates that are relevant to customer application 504. If no updates are available, then instead publisher 506 may indicate to customer application 504 that no updates are available, and in that case process 900 may end.

Next, control of process 900 transitions to step 906, at which customer application 504, after having received the updates transmitted by message 904, may process the updates, e.g., by updating the code or data provided by way of the message received by customer application 504 at step 904.

Next, control of process 900 transitions to step 908, at which customer application 504, after having processed the updates during step 906, may send a Post Data( ) message (or equivalent) to publisher 506 in order to transmit and to publish the result of any processing done by customer application 504 as a part of step 906.

Next, control of process 900 transitions to optional step 910, at which mobile user 514 may send a Request Synchronization( ) message (or equivalent) to mobile device 510 in order to request that mobile device 510 synchronize itself to the current copies or versions of code or data available from publisher 506.

Next, control of process 900 transitions to step 912, at which mobile device 510 begins to process the Request Synchronization( ) message (or equivalent) received at step 910.

Next, control of process 900 transitions to step 914, at which mobile device 510 may send a Synchronize( ) message (or equivalent) to publisher 506 in order to request that publisher 506 send to mobile device 510 information related to the current copies or versions of code or data available from publisher 506 or to send from mobile device 510 to publisher 506 updated information available in the secure store of the mobile device. The information may include the current copies themselves, or may include just the updates or differences since the last time that mobile device 510 had been synchronized.

Next, control of process 900 transitions to optional step 916, at which if the code or data available from publisher 506 has changed as a result of the synchronization process with the device, then publisher 506 may send to customer application 504 a Notification( ) message (or equivalent) in order to inform customer application 504 of the updated code or data.

Next, control of process 900 transitions to optional step 918, at which publisher 506 may send to mobile device 510 an Update Application Configuration (if identified as changed) and Data( ) message (or equivalent) in order to inform mobile device 510 of an update to the published code or data, or to inform mobile device 510 that there have been no updates to the code and data since the last time that mobile device 510 had been updated.

Next, control of process 900 transitions to step 920, at which mobile device 510 may process and store the updated application configuration and data received from publisher 506 at step 918.

Next, control of process 900 transitions to step 922, at which mobile device 510 may use the updated application configuration, using the updated data as necessary, which had been received from publisher 506 at step 918 and stored by mobile device 510 at step 920.

Embodiments of the present invention include a system having one or more processing units coupled to one or more memories. The one or more memories may be configured to store software that, when executed by the one or more processing unit, allows practice of embodiments described herein, including at least in FIGS. 3-4 and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A system to provide access to protected data for a communication terminal, comprising:
   a first server coupled to a publisher database, the first server comprising a processor coupled to a memory, wherein the publisher database is configured to store protected data in encrypted form;
   a second server coupled to the first server, the second server comprising a processor coupled to a memory, the second server configured to provide cryptographic authentication of access to the protected data, independent of secure sockets layer (SSL);
   an interface comprising a transceiver to a first secure channel, between the first server and the communication terminal; and
   an interface comprising a transceiver to a second secure channel, between the first server and a customer application hosted by the second server,
   wherein the first server is configured to exchange protected data with an application container of the communication terminal via the first secure channel, and to exchange protected data with the customer application via the second secure channel,
   wherein the first server comprises a queue in order to queue notifications when the customer application is offline, the notifications corresponding to changes in the protected data, wherein the first server is further configured to deliver the notifications from the queue to the customer application when the customer application is back online,
   wherein the application container comprises a mobile application hosted by a client, the mobile application configured to host and support a plurality of application configurations providing end-to-end security of the protected data.

2. The system of claim 1, wherein the first server is configured to receive a configuration of at least one of a datagroup, a dataset and a uniform resource locator (URL) of the customer application, and the first server is further configured to provide to the customer application a notification when data from the datagroup is affected.

3. The system of claim 1, wherein the first server is configured to receive an updated application configuration from the customer application, and further configured to post the updated application configuration to the communication terminal upon receiving a synchronization request from the communication terminal.

4. The system of claim 1, wherein the communication terminal is configured to use a user password and received security credentials to derive an encryption key for the secure storage, without storage of password or encryption keys in the communication terminal.

5. The system of claim 1, wherein the communication terminal receives application configuration and logic from at least one of the first server and the second server.

6. The system of claim 1, wherein the communication terminal receives application configuration and logic via an encrypted wireless channel.

7. The system of claim 1, wherein the first server is configured to accept Secured Web Service Interface calls to exchange protected data with customer applications, and to allow an application to access only the protected data that the application is assigned to monitor.

8. The system of claim 1, wherein the customer application comprises an application configured to communicate interactively with the first server to discover modified information in the publisher database.

9. The system of claim 1, wherein access to configuration applications is based upon group membership of a user of the communication terminal.

10. The system of claim 1, wherein the mobile processor is further configured to provide a first mobile application and a second mobile application, wherein the second mobile application is configured to share encryption modules and data with the first mobile application.

11. The system of claim 1, wherein the communication terminal is configured to download multiple application configurations for respective types of users.

12. The system of claim 1, wherein the secure storage is configured to support remote automatic erasure of secure information and remote restoration of an unavailable secure storage.

13. The system of claim 1, wherein the first server is configured to support a multi-organization configuration.

14. The system of claim 1, wherein the first server comprises an interface to the communication terminal and customer applications via a non-secure sockets layer (non-SSL) secure communication channel that is compatible with secure sockets layer (SSL).

15. The system of claim 1, wherein the first server is configured to publish information in support of a plurality of communication terminal, independently of each other.

16. The system of claim 1, wherein the first server is configured to transmit one or more updates to the customer application upon receiving a retrieve update request from the customer application, and wherein the customer application is configured to process the one or more updates and to send an updated application configuration to the first server.

17. A method to provide access to protected data for a communication terminal, comprising:
   storing, by a first server coupled to a publisher database, protected data in encrypted form;
   receiving, from the communication terminal, a request to access the protected data, the request comprising purported credentials;

transmitting the purported credentials to a second server in order to authenticate the purported credentials by cryptographic authentication, independent of secure sockets layer (SSL);

if the purported credentials are authenticated, granting access between an application container of the communication terminal and the protected data;

communicating the protected data between a customer application hosted by the second server and the publisher database;

communicating the protected data between the communication terminal and the publisher database;

generating, by the first server, a queue in order to queue notifications when the customer application is offline, wherein the notifications correspond to changes in the protected data; and delivering, by the first server, the notifications from the queue to the customer application when the customer application is back online, wherein the application container comprises a mobile application hosted by a client, the mobile application configured to host and support a plurality of application configurations providing end-to-end security of the protected data.

18. The method of claim 17, further comprising:
receiving a configuration of at least one of a datagroup, a dataset and a uniform resource locator (URL) of the customer application;
and providing to the customer application a notification when data from the datagroup is affected.

19. The method of claim 17, further comprising: receiving, from the customer application, an updated application configuration; and posting, by the first server, the updated application configuration to the communication terminal upon receiving a synchronization request from the communication terminal.

20. The method of claim 17, wherein the communication terminal is configured to provide a first mobile application and a second mobile application, wherein the second mobile application is configured to share encryption modules and data with the first mobile application.

* * * * *

UNITED STATES PATENT AND TRADEMARK OFFICE
CERTIFICATE OF CORRECTION

PATENT NO. : 9,792,458 B2
APPLICATION NO. : 14/269893
DATED : October 17, 2017
INVENTOR(S) : Elkin Florez et al.

It is certified that error appears in the above-identified patent and that said Letters Patent is hereby corrected as shown below:

In the Specification

Column 3, Line 54, after "systems" delete "," and insert -- . --.

Column 4, Line 9, after "server" delete ";" and insert -- . --.

Column 12, Line 51, after "platform" delete ":" and insert -- . --.

Column 16, Line 19, after "306" insert -- . --.

Column 21, Line 25, after "820" delete "," and insert -- . --.

Signed and Sealed this
Sixth Day of March, 2018

Andrei Iancu
*Director of the United States Patent and Trademark Office*